March 4, 1952 J. C. O'BRIEN ET AL 2,588,031
RADIO COMMUNICATION SYSTEM
Filed Nov. 1, 1947
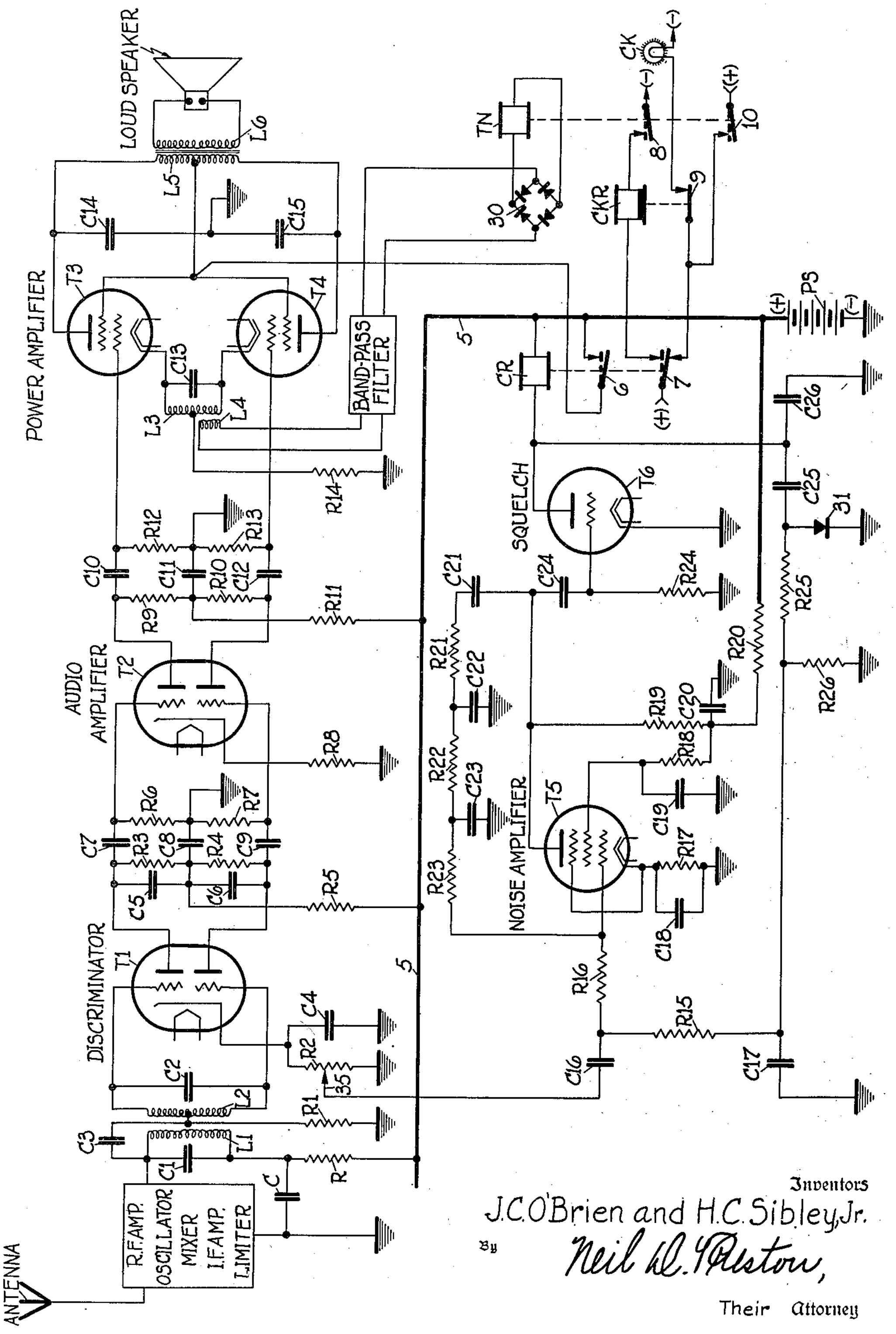
Inventors
J.C.O'Brien and H.C.Sibley,Jr.
By Neil D. Preston,
Their Attorney Patented Mar. 4, 1952

2,588,031

UNITED STATES PATENT OFFICE 2,588,031

RADIO COMMUNICATION SYSTEM

John C. O'Brien and Henry C. Sibley, Jr., Rochester, N. Y., assignors to General Railway Signal Company, Rochester, N. Y.

Application November 1, 1947, Serial No. 783,484

9 Claims. (Cl. 250—20)

This invention relates to radio receiving organizations, and more particularly pertains to a receiving organization adapted for use with mobile units.

In radio communication systems employed in connection with the governing of traffic, such as on railroads and the like, it is considered desirable to provide means for checking the continued operativeness of the communication system by intermittently transmitting check signals from a central station. These check signals are transmitted intermittently, so that distant stations may initiate transmission to the central station between successive check signals and cause the cessation of the transmission of the intermittent check pulses. Similarly, if the operator at the central station desires to transmit, he causes the cessation of the intermittent check pulses or signals and then transmits the desired message. If at any time the distant station fails to receive a regular message upon the cessation of the check signals, the operator is advised in this way that the communication system has failed.

In a system as above briefly described, it is apparent that the receiving apparatus at a distant station is normally in condition for the reception of check signals and regular messages. Since a radio receiver is adjusted to give a proper volume of audio signal when a regular message is being received, it will be apparent that a receiver will be extremely sensitive to tube noises, electrical noises adjacent the receiving location, and atmospheric static upon the cessation of the reception of a regular carrier signal. For this reason, it is desirable to provide means for squelching or muting the amplifier of a receiver when a carrier signal (for a check signal or a regular message) is not being received, and also arranged in a manner to require the reception of a carrier signal substantially above the noise level of the location before the amplifier is again rendered active.

In view of the above considerations, one object of the present invention is to provide so called squelch control which will render the associated power amplifier active only when a carrier signal above a predetermined value is being received.

In the usual fixed station to fixed station type of variable frequency receiver, the conventional squelch circuits can be made sufficiently quick acting so that the cessation of a carrier signal, such as may occur in tuning from one station to another, cuts off the amplifier very quickly to minimize any amplification of the inherent radio noise. In this connection, it can be also seen that the usual detuning of the receiver with respect to a carrier signal is more gradual than the action of the squelching or muting circuits so that they are able to operate as rapidly as the detuning operation occurs.

In an organization where a receiver is maintained tuned for reception from a particular station and such particular station intermittently transmits, it is apparent that the dying out of the carrier signal will be more rapid and in the lead of the conventional delayed squelching action which has a time lag. Due to this lagging characteristic of the squelch control, a "crash" or a so called "noise tail" results upon each cessation of a carrier signal. For this reason, it would be desirable to have the squelch control act as rapidly as possible.

However, a mobile receiving unit may pass through areas of weak signals for short intervals of time during which reception might be poor but would still be intelligible if reproduced. In such cases, it would be desirable to have the squelch control so adjusted as to not cut out the receiver until the carrier signal strength falls to a value substantially equal to the noise level of the location and in this way a weak carrier signal may be received until it decreases almost to the point of non-intelligibility, and still have the advantage of squelch circuit control when the signal actually ceases.

In connection with mobile units, there is an added phenomenon which involves the movement of the vehicle. For example, the movement of the vehicle at times causes the receiver to pass through points of no signal which may be due either to signal absorption by adjacent metal objects or due to signal cancellation involving reflected signals and the like. Under other conditions, it is possible during the passage of a mobile unit through an area of fringe reception to intermittently pass through points of no reception for such brief intervals of time that should the receiver remain continuously operating, the message might still be received. Under such circumstances, if the squelch control circuits are so quick acting as to close the receiver in passing through each of these intervals of no signal, a considerably greater portion of the message will be cut out rendering the message non-intelligible. Thus, it may be said that for mobile units, a squelch control should be provided which is sufficiently slow in its action to hold over brief intervals of no signal. These intervals of no signal have been conveniently termed conditions of "flutter." However, if the squelch control circuits are made sufficiently slow to avoid the intermittent cutting out of the receiver due to conditions of flutter, the ending of each carrier signal transmitted from the central station, regardless of whether it is the end of a message or a check pulse, results in a prolonged "crash" or "noise tail." It is apparent that such an artificial production of noise is highly undesirable especially where check pulses are employed that are continuously recurring. Similar flutter conditions occur in receivers which receive signals from mobile transmitters, passing through more or less favorable locations for transmitting.

In accordance with the principles of the present invention, it is proposed to provide squelch circuit control means which operates very rapidly upon the cessation of a carrier signal of normal strength especially under those circumstances in which the amplitude of the received signal has been relatively steady; while at the same time so organizing the squelch control circuit as to provide that its operation will be relatively slow upon the cessation of the reception of a carrier signal which has been varying in amplitude just prior to its complete cessation. In other words, one characteristic feature of the present invention may be said to reside in the provision of a squelch control circuit organization having a variable time constant of operation which is varied dependent upon the degree of steadiness of the signals received.

In providing electrical squelch control means for radio receivers, especially those involving the use of prolonged time lags under certain circumstances, there is such a gradual variation of control of the amplifier that the "hang-over" characteristic of the noise tails is greatly pronounced. In accordance with the present invention, it is proposed to use a control means which is abrupt in its response.

In the usual frequency modulation type of receiver, a limiter stage is employed to provide a substantially constant input to the discriminator and audio frequency amplifiers when the received signal is above a given value. However, as above mentioned, it is many times desirable to receive signals which may be in the fringe range of reception where the amplitude of the carrier signal is below that upon which a limiter stage may effectively operate.

In accordance with the present invention, it is proposed to provide a discriminator organization that is effective to balance out the variations in amplitude that are not removed by a limiter stage. The discriminator stage of the present invention is to be considered in the nature of an improvement over the prior application of J. C. O'Brien, Ser. No. 747,266 filed May 10, 1947, and no claim is made herein to any subject matter shown and described in such prior application.

In accordance with the present invention, it is also proposed to so organize the audio and power amplifier that each will be effective to balance out undesired variations in amplitude of the audio signals in a manner to tend to increase the quality of the received signals.

A further characteristic feature and object of the present invention resides in the combination of a squelch control circuit organization with a discriminator and amplifying circuit organization in which it is possible to definitely differentiate between the presence and absence of a carrier signal.

Other objects, purposes, and characteristic features of the present invention will be in part pointed out and in part apparent as the discussion of the invention progresses.

In discussing the invention in detail, reference will be made to the single accompanying drawing which illustrates a radio receiving organization in a simplified and diagrammatic manner as one embodiment of the present invention.

For the purpose of simplifying the illustration and facilitating in the explanation, the various parts and circuits constituting the embodiment of the invention have been shown diagrammatically and certain conventional illustrations have been employed, the drawings having been made more with the purpose in mind of making it easy to understand the principles and mode of operation than with the idea of illustrating the specific construction and arrangement of parts that would be employed in practice. Thus, the various devices are illustrated in a conventional manner, and various conventional symbols are used to indicate the devices, wiring connections, batteries, or other sources of electrical current and the like.

With reference to the drawing, a receiving organization is illustrated as comprising in general an antenna and ground system, a radio frequency amplifier, an oscillator, a mixer stage, an intermediate amplifier, a limiter, a discriminator, an audio frequency amplifier, a power amplifier, a loudspeaker, a noise amplifier, a squelch tube, a carrier responsive relay, a tone responsive relay, a check repeating relay, and suitable circuit organizations to accomplish the reception, the squelch control, and the checking features associated with the complete system.

The antenna and ground system supplies the incoming signal to a suitable radio frequency amplifier, oscillator, mixer, intermediate frequency amplifier, and limiter stage as indicated in block form in the drawing. The output of the limiter stage is supplied in the conventional way to a suitable coupling transformer indicated in the drawings as having windings L1 and L2. The winding L1 is tuned to the center frequency of the intermediate frequency by a condenser C1 which completes its circuit with respect to the limiter through radio frequency by-pass condenser C. The energy for this output circuit of the limiter is supplied from the common plate supply source PS over the bus 5. The plate supply PS is by-passed to ground insofar as radio frequencies are concerned by the condenser C.

The winding L2 is inductively coupled to the winding L1 and is provided with a mid-point connection through condenser C3 to the upper terminal of the tuned circuit constituted by winding L1 and condenser C1. A condenser C2 is connected across the outer terminal of the winding L2 to also tune such secondary winding L2 to the center frequency of the intermediate stages of the receiver. The outer terminals of the winding L2 are connected to the respective grids of the twin discriminator tube T1. The cathode of the discriminator tube T1 is indicated as being common to both parts of the tube, but it should be understood that separate tubes might just as well be employed in place of the twin tube illustrated, in which case the separate cathodes would be connected together and connected to ground through a common bias resistor R2. The bias resistor R2 has an associated condenser C4 for the purpose of by-passing radio frequencies, but not noise frequencies.

A grid leak resistor R1 is connected between the mid-point of the winding L2 and ground so as to complete the grid-cathode circuits for both parts of the discriminator tube T1. Plate supply energy is provided for the anodes of the tube T1 from the battery PS over the bus wire 5 and through the resistor R5 in series with the resistors R3 and R4 for the respective tubes. The radio frequency by-pass condensers C5 and C6 are respectively used to shunt the resistors R3 and R4.

The output of the discriminator tube T1, which is of course audio frequencies, is supplied through blocking condensers C7, C8, and C9 to the push-pull connected audio frequency amplifier twin tube T2. Resistors R6 and R7 are employed for the usual grid leak purposes. A resistor R8 is connected in the cathode of the amplifier tube T2, which resistor R8 acts to provide the same bias for both parts of the tube in such a manner that any unbalance in the tube due to amplitude variations in the signal will tend to be eliminated by the degenerative action of this common biasing resistor R8.

The output of the audio frequency amplifier is connected to the power amplifier, including tubes T3 and T4, through the condensers C10, C11, and C12 which are accompanied by the usual coupling resistors R9, R10, R12, and R13 for push-pull operation. Plate potential for the audio amplifier tube T2 is supplied through the resistor R11 from the bus 5.

The output of the power amplifier is connected in the usual way to a loudspeaker coupling transformer having primary and secondary windings L5 and L6 respectively. The opposite terminals are by-passed to ground through condensers C14 and C15.

The cathodes of the tubes T3 and T4 are connected together through the primary winding L3 of a coupling transformer. This primary winding L3 has a mid-point connection through resistor R14 to ground. A condenser C13 is connected across the primary winding L3 to by-pass any stray radio frequency. The screen grids of these power amplifier tubes T3 and T4 are connected to the plate supply through a circuit including front contact 6 when the carrier relay CR is picked up. It is also noted that a mid-tap of the primary winding L5 of the coupling transformer is connected to the plate supply bus 5 through the same contact 6. In this way, the closure of front contact 6 of the carrier relay connects plate supply energy to both the anode and the screen grid of the respective tubes T3 and T4.

A secondary winding L4 is associated with the winding L3 so that the audio frequencies which are included in the plate cathode circuits of the power amplifier tubes T3 and T4 are supplied to a band-pass filter (indicated in block form) which is designed to pass only the frequencies of a predetermined range which have been assigned to a distinctive tone for use in connection with the checking features of a complete communication system, as will be discussed more fully hereinafter. The output of this band-pass filter is supplied to a fill wave rectifier 30 which then supplies direct current to a so called tone responsive relay TN.

The resistor R2 employed for the cathode bias of the discriminator stage is of the potentiometer type, and the movable arm is connected to the control grid of the pentode noise amplifier tube T5 through condenser C16 and resistor R16. In other words, the amplitude of the potentials supplied to the noise amplifier can be varied for reasons later explained. Condenser C16 is made small to present a high reactance to voice frequencies but low reactance to noise frequencies such as in the order of 15 kc. The pentode tube T5 has its suppressor grid connected directly to its cathode which is connected through the resistor R17 to ground. The resistor R17 is by-passed for radio frequencies and high frequency audio frequency noise by condenser C18. A connection between the condenser C16 and resistor R16 extends through resistor R15 and condenser C17 to ground. The anode of the noise amplifier tube T5 is supplied with energy from the plate supply battery PS through resistors R20 and R19. A branch circuit for supplying energy to the screen grid is provided through resistor R18 which is by-passed by condenser C19 for high frequency A. F. noise. Condenser C20 is for the purpose of by-passing resistor R20 and the plate supply PS with respect to radio frequencies and high frequency A. F. noise.

The condensers C16, C18, C19, and C24 are made sufficiently small in capacity so that they present a low reactance only to frequencies above 10 kilocycles, for example, since it is the audio and super audio frequencies above this value which are used to operate the squelch control. This is done to discriminate against the lower frequencies which are found in the voice spectrum. Further discrimination against lower frequencies of the voice spectrum is obtained by the provision of the low-pass feed-back network including resistors R21, R22, R23, and condensers C21, C22, and C23. This feed-back network makes the noise amplifier tube T5 degenerative for low frequencies, and therefore a poor amplifier for such low frequencies as are found in the voice spectrum.

The output of the noise amplifier is fed through blocking condenser C24 to the control grid of the squelch tube T6. A grid leak resistor R24 is connected between the control grid and ground. The plate supply PS is connected through a carrier relay CR to the anode of the tube T6 so that whenever the tube T6 is conductive, the current which flows through its anode cathode circuit acts to energize the relay CR.

A special timing circuit includes condensers C25 and C26 together with resistors R25 and R26 with an associated dry plate rectifier 31 of the selenium or the copper oxide type. One terminal of this timing circuit is connected between the carrier relay CR and the anode of the tube T6, while the other terminal is connected to the resistor R15. The action of this timing circuit organization will be later described.

The carrier relay CR and the tone relay TN have associated therewith a slow release repeating relay CKR. This relay is relatively quick to pick up, but is slow in dropping away. Associated with these three relays is a check lamp CK which is normally illuminated during the continued intermittent reception of check pulses.

In other words, under the normal operation of the system, a central office causes the transmission of time spaced check pulses having particular tones modulating the carrier signal. This results in the intermittent picking up of both relays CR and TN at the same time. It is apparent that when both relays are picked up, front contacts 7 and 8 are closed energizing the relay CKR, but since this relay is slow in releasing, it remains picked up between successive energizations. The continued closure of front contact 9 allows the front contact 10 to energize the lamp CK during the reception of each check pulse, and allows the back contact 7 of relay CR to energize the check lamp CK between such pulses.

In this way, the check lamp CK is energized so long as check pulses are received, but the cessation of check pulses allows the relay CKR to drop away and extinguish the lamp CK.

On the other hand, if the central office or some other station transmits a message which results in the picking up of the carrier relay CR without the picking up of the tone relay TN, then it is apparent that the opening of back contact 7 immediately deenergizes the check lamp CK and allows the relay CKR to release. Such extinguishment of the check lamp CK advises the operator that he should receive a message through the loudspeaker; and in the event of failure to receive such a message, he is advised that there is some failure in the communication system.

With the above general understanding of the circuit organization, a more detailed description will now be given with respect to one possible theory of operation for the interrelated circuit elements.

The output circuit of the limiter stage including the primary winding L1 and the condenser C1 is tuned to the center frequency of the signal being received i. e., the frequency of the intermediate frequency amplifier. In other words, the signal being received is frequency modulated, and at times will be a frequency above the center frequency and at other times will be a frequency below the center frequency. The condenser C1 and winding L1 have such values as to be tuned sufficiently broadly to include the range of frequencies under which the received signal may vary. Although the primary tank circuit, including winding L1 and condenser C1, is tuned more broadly than the secondary tank circuit including winding L2 and condenser C2 the reactance of the winding L1 greatly exceeds the resistance of the tank circuit so that the application of radio frequency potentials across this tuned tank circuit causes the current in the winding L1 to lag such potentials by substantially ninety degrees regardless of the particular frequency applied.

The presence of such radio frequency current in the winding L1 causes a radio frequency potential to be induced in the winding L2 which lags the primary current by substantially ninety degrees. For this reason, the potential induced in the winding L2 is substantially one hundred and eighty degrees out-of-phase with respect to the radio frequency potentials applied across the primary tank circuit. Since the secondary tank circuit including winding L2 and condenser C2 are also tuned to the same center frequency as the primary tank circuit, the resulting action is the same as if the winding L2 and condenser C2 were connected in series with a separate source of radio frequency potential. This is because the current which circulates in the equivalent series resonant circuit constituted by the winding L2 and condenser C2 is in phase with the induced potential causing it. This circulating current causes a potential drop across condenser C2 which lags such circulating current by substantially ninety degrees. In other words, the induced potentials in the winding L2 are actually distributed through out the winding in such a way that the potential appearing at its terminals is actually the potential across the condenser C2.

In view of the above, it will be apparent that the radio frequency potentials appearing across the condenser C2, and applied directly to the grids of the twin discriminator tube T1, are substantially ninety degrees out-of-phase with the radio frequency potentials applied to the primary tank circuit. In brief, it may be generaly stated that when an electromotive force is induced in a loosely coupled tuned secondary circuit as the result of a resonant current flowing in a tuned primary circuit, the voltage across the respective primary and secondary coils (or windings) are substantially ninety degrees out-of-phase.

The induced potential in winding L2 causes a net current flow in the secondary tank circuit which is in phase with such potential while resonant conditions are actually met. But when the frequency is above the resonant frequency, the current leads the induced potential an amount dependent upon the frequency difference; and when the frequency is below the resonant frequency, the current lags the induced potential an amount dependent upon the frequency difference. These currents in flowing through the condenser C2 causes potential drops across it which lag such currents by substantially ninety degrees. As above mentioned, these potentials are supplied to the control grids of the opposite portions of the twin discriminator tube T1. More specifically, the potential of the upper portion of the winding L2 is applied to the upper control grid of the tube T1, with the return path being supplied by the resistor R1 in series with resistor R2 and condenser C4 in parallel and having a common connection at ground. Similarly, the potential associated with the lower portion of the winding L2 is applied to the lower control grid of the tube T1 with a return path through the resistors R1 in series with resistor R2 and condenser C4 in parallel with a common connection to ground between them.

The potentials applied to the primary tank circuit are also conductively applied to the control grids of the twin discriminator tube T1 by reason of a circuit including the condenser C3, the opposite halves of winding L2, and the two resistors R1 and R2 in series with condenser C4 in parallel with resistor R2. In other words, the condenser C3 is a radio frequency by-pass condenser which acts to couple the the limiter stage to the discriminator stage and the potential thus applied causes a voltage drop across the resistor R1 which is applied to the respective control grids with the same phase relationship through the opposite portions of the winding L2 with a return path through resistor R2. Since the primary radio frequency potentials are both conductively and inductively applied to the grids of tube T1 by a circuit having in common the resistor R1, it should be apparent that the actual potential applied to the grids of tube T1 will be the vectorial sum of conducted and induced potentials. The vectorial sum of the conducted potential and the potential across the condenser C2 as applied to the grid of the upper portion of tube T1 will be in one quadrant, while the actual potential applied to the grid of the lower portion of the tube T1 will be the vectorial sum of the same potentials but in the opposite quadrant. In other words, the conducted voltage is taken as a reference voltage as it appears across the resistor R1, while the voltage added to it from the opposite terminals of the winding L2 are one hundred and eighty degrees out-of-phase with each other and ninety degrees out-of-phase with respect to the reference voltage. This means that the resultant voltages for the two control grids must necessarily fall in different quadrants.

When the frequency of the signal corresponds to the resonant frequency of the secondary tank circuit, the inductively coupled potentials for the two control grids will lead and lag respectively by ninety degrees the reference potential across the resistor R1. Thus, the two resultant potentials correspond in value, although they have a substantial phase difference.

The resistor R2 is of such a value that the control grids of the tube T1 are biased to substantially cut off. Thus, the resultant radio frequency potential on the control grid of the upper portion of the twin tube T1 results in a direct current in the plate circuit having an average value dependent upon the amplitude of such resultant radio frequency potential. Likewise, the resultant radio frequency potential applied to the control grid of the lower portion of the twin tube T1 results in a direct current in the associated plate circuit having an average value dependent upon the amplitude of such resultant radio frequency potential. These two direct currents flow through their respective resistors R3 and R4 producing equal and opposite potentials across these resistors so that in this case where the input radio frequency signal is at the center frequency, the net output of the discriminator is zero.

As the frequency changes either higher or lower with respect to the resonant frequency of the tuned circuit including winding L2 and condenser C2, the phase of the potential appearing across the condenser C2 advances or recedes with respect to the reference potential across the resistor R1 as conductively supplied to it through condenser C3. Thus, under one condition (frequency high) the resultant radio frequency potential will be high as applied to the other control grid of the twin tube; while under another condition (frequency low) the situation will be just the opposite. When the radio frequency potential applied at the control grid of one portion of the tube differs from the radio frequency potential applied to the control grid of the other portion of the tube, it will be readliy apparent that the direct current outputs of the two portions of the tube will also differ, and since these currents flow through the resistors R3 and R4 in opposite directions, the potential drop across these two resistors will also differ in magnitude and polarity, so that the net difference between the two polarities will be of a value representing the radio frequency difference on either side of the center frequency. It will be apparent that when the radio frequency difference is high with respect to center frequency, that the net difference between the direct current potentials of resistors R3 and R4 will be of one polarity, but when the radio frequency difference is low with respect to the center frequency, the net difference in the direct current potential cross resistors R3 and R4 will be of the opposite polarity. Thus, when the frequency modulations vary above and below the center frequency at an audio rate, the net difference between the two portions of the discriminator tube T1 vary in accordance with such frequency modulations to positive and negative values at an audio frequency to produce an audio frequency output. In this way, the audio message of the received radio frequency signal is detected and made available for amplification and reproduction.

As above mentioned, the potential across the winding L2 may vary in amplitude due to radio noise of various kinds, but it is desired that the net difference between the outputs of the two portions of the twin discriminator tube T1 shall vary only in accordance with variations in the frequency of the input signal due to frequency modulation.

In accordance with the present invention, the cathode resistor R2 serves normally to maintain bias for both control grids of the tube T1 at a value approximating cut-off. The resistor R2 is by-passed for frequencies above audio frequencies, such as frequencies above 15,000 cycles for example, so that the resistor R2 has little effect on the output of the discriminator with respect to frequencies above that value, but for frequencies within the noise or audio range, the resistor R2 has a highly degenerative effect on all input signals which tend to be applied equally to both halves of the circuit.

When noise voltages, due to static, local interference, or the like, are superimposed upon a frequency modulated signal, the resultant signal is formed by waves of non-symmetrical characteristics, i. e., the signal varies in amplitude. When these non-symmetrical signals are impressed upon the discriminator circuit organization, the effect is that the change in signal strength or amplitude is applied to both the reference voltage and the induced voltage equally so that the resultant voltages applied to the two control grids are changed equally. If the change is an increase in signal strength or amplitude, then a greater plate current tends to flow in both plate circuits of the twin tube T1; but this increases the grid bias produced by the voltage drop across resistor R2 which tends to limit such plate current increase. Similarly, if the change is a decrease in signal strength, the plate current tends to decrease in both plate circuits of twin tube T1, but this decreases the bias produced by the voltage drop across resistor R2 which tends to limit such plate current decrease. From this, it can be seen that resistor R2 provides a degenerative effect on amplitude variations in the input signal. Thus, the output of the discriminator tends to be more nearly in accordance with the actual frequency modulation characteristics of the signal by eliminating the effect of amplitude variations to a large degree.

The output of the discriminator twin tube T1 is fed through a capacitance-resistance coupling network to an audio amplifier of the push-pull type. Likewise, the output of the push-pull audio amplifier twin tube T2 is fed through a capacitance resistance coupling network to a power amplifier including tubes T3 and T4 also connected to operate in a push-pull manner. In both amplifiers, a common cathode resistor is provided to supply the grid bias. Specifically, the audio amplifier has the resistor R8 for supplying the grid bias for both grids of the twin tube T2; while resistor R14 supplies the grid bias for the power amplifier tubes T3 and T4. Any voltage drop across either resistor is applied equally to both grids with which that resistor is associated and also in the same phase. Assuming each amplifier to be operating as a Class A amplifier, the grid bias remains substantially constant if the signal voltages applied to it are kept within the linear portion of the tube and if such signal voltages are symmetrically applied to both parts of the push-pull amplifier. This is because the plate current in one plate circuit is rising while the plate current in the other plate circuit is decreasing so that the sum of the cathode current has no varying component and the resultant voltage drop across the bias resistor remains substantially constant.

More specifically, let us consider the push-pull operation of the audio amplifier twin tube T2 and its relation to the discriminator stage. In the above description, it was convenient to consider the audio output of the discriminator as being the net difference between the average direct current potentials across the resistors R3 and R4 as giving the audio frequency envelope or signal in order to make clear the detection operation of the discriminator and the manner in which amplitude variations are reduced. Actually, the potential rises and falls in each resistor R3 or R4 with respect to ground potential, and such rising and falling potentials act through the blocking condenser to apply an audio frequency signal to each grid of the twin tube T2. In other words, the radio frequencies rectified by the upper portion of the tube T1 are smoothed out by the condenser C5 so that the net effect is a rising and falling of potential at the upper end of the resistor R3 in accordance with the frequency modulation. These changes in potential when passed through the condenser C7 result in an alternating current at the audio frequency. The same operation occurs with respect to the lower portion of the discriminator stage. In this way, two audio frequency signals are applied to the audio amplifier, one to each half of the amplifier. Thus, it can be seen that in fact the net difference in potential is not taken between the resistor R3 and R4, but the potentials are actually applied to the respective halves of the audio amplifier.

Although the degenerative action of the resistor R2 removes a substantial portion of amplitude variations in the radio frequency signal, it cannot remove all such amplitude variations. Thus, any amplitude variations which remain are actually transferred to the input of the audio amplifier so that the two audio frequency signals applied to the opposite halves of the audio amplifier are not symmetrical with respect to each other. As above mentioned, while the audio signal impressed on the two grids of the tube T2 are identical, the grid bias provided by resistor R8 remains substantially constant, but when there is a lack of symmetry between the two audio signals, the net current flow through resistor R8 changes accordingly and thus changes the bias on the grids of tube T2 in such a way as to be degenerative with respect to non-symmetry of the applied signals.

The cathode resistor R8 also provides another desirable characteristic in the audio amplifier by tending to compensate for the non-linearity of the tube when the input signal to the amplifier varies in amplitude to such a large degree as to operate twin tube T2 beyond the linear portion of its characteristic. In other words, if the input signal to the amplifier varies in amplitude to such an extent as to cause grid changes in voltage beyond the linear portion of its characteristic, the increase in plate current during the positive half cycle of the signal may exceed the plate current during the negative half cycle so that the average or direct current component of plate current will exceed the normal value. This can easily occur during the large grid swings, since current in either portion of the tube T2 may be driven to very high values during the positive half cycle, but only to zero during the negative half cycle. Thus, the net sum of the currents in the resistor R8 is increased and the bias on the tube T2 is increased giving a degenerative effect on the output of the tube with respect to amplitude variations beyond the linear characteristic of the tube. This degenerative effect is especially desirable in mobile radio equipment of the type contemplated by the present invention, since it tends to maintain the total output volume of the messages within predetermined limits regardless of extreme variations in the input signal.

Although the above description of the audio amplifier has been directed more particularly to the features and functioning of twin tube T2 and its cathode bias resistor R8, it should be understood that the power amplifier and resistor R14 operate in a similar manner. In this way, the resistors R8 and R14 both serve to remove amplitude variations from the signal and results in a relatively constant output for the loudspeaker.

In short, the balanced push-pull circuits are degenerative for signals which are unbalanced for many causes, such as tube unbalance, mistuning, resistor variation, RF and AF distortion in conversion, amplification and detection in the receiver. This is because all dissymmetry in alternating current from these sources is caused by even harmonic content, which is often the most objectionable of the distortion products. The present invention removes such even harmonic distortion products, and produces remarkable improvement in the pleasing quality of the output, as well as suppresses noise and interfering beat notes, which appear as amplitude modulation.

As above mentioned, during operation of the power amplifier when the applied signal has little or no amplitude variation, the current in resistor R14 remains substantially constant, but all of the audio frequencies appear in the opposite halves of the winding L3, cancelling each other with respect to the impedance of the entire winding. However, the inductively coupled winding L4 associated with one half of the winding L3 picks up such audio frequencies and applies them to a band-pass filter which is designed to pass only that particular frequency or tone selected for the operation of the tone relay TN. This particular frequency which is passed by the band-pass filter is applied to the rectifier 30 which in turn has its output connected to the relay TN, so that such relay TN is picked up upon the reception of each tone check pulse.

As above explained, during the reception of a carrier signal variations in the signal applied to the discriminator appear across the resistor R2. Upon the cessation of the reception of a carrier signal, it is obvious that only noise voltages will be applied to the discriminator, and these will likewise appear across the resistor R2. In fact, it is across this resistor R2 that noise voltages exist in the receiver to the greatest degree separate from other voltages, and it is for this reason that the connection to the noise amplifier and squelch control is made across this resistor R2.

The resistor R2 has a variable connection 35 which can be varied as desired to supply the degree of noise voltages required to operate the squelch control and these noise voltages are supplied to the control grid of the noise amplifier tube T5 through condenser C16 and resistor R16. The noise amplifier is made selective against voice frequencies both by the selection of the capacity of the condensers C16, C18, C19, and C24 and by a feed-back network which renders the noise amplifier degenerative for low frequencies in the voice spectrum.

When a carrier signal of normal strength is being received, there is relatively little noise so that the squelch tube T6 is conductive i. e. current flows from the plate supply PS over bus 5, windings of carrier relay CR, plate-cathode circuit of squelch tube T6. On the other hand, when there is no carrier signal being received, or when the carrier signal being received reaches such a low value that the noise potentials have risen to a particular value, as selected by the position of movable member 35, the noise frequencies are applied to the grid of noise amplifier T5 and in turn to the grid of the squelch tube T6 which acts to rectify the noise voltages and produce sufficient biasing voltage to reduce the plate current of the squelch tube T6 below the drop away current value for the relay CR. In this way, the relay CR is made to pick up when a carrier signal of the desired strength is present to suppress the noise, but is caused to release (drop away) when the carrier signal ceases (or effectively ceases) and the noise frequencies are predominate.

When the relay CR is picked up, front contact 6 is closed to render the power amplifier effective; but when the carrier signal ceases, the relay CR immediately drops away breaking the supply of energy to the power amplifier abruptly so that there is no transition period during which the amplifier is variably biased. Such transition periods in the conventional electronic squelch control cause the production of a crash and squeal resulting from the amplification of the noise received at the cessation of the carrier signal. In other words, disregarding the timing characteristics which will be presently described, the cessation of the carrier signal results in the immediate drop of the carrier relay CR to cut-off the power amplifier without objectionable "noise tails."

It is also well understood in the art that the pick-up current value for a relay is somewhat higher than its drop away value, and this characteristic is used to keep the receiver turned on during slight fluctuations in the carrier signal strength due to "flutter" conditions, i. e., where the carrier signal is not constant, but may have blank spaces as previously described. In other words, a substantial carrier signal is required to be present to cause the relay to be picked-up, whereas, a relatively weak carrier signal will maintain the relay picked-up. However, it should be understood in this connection that this differential between pick-up and drop away current values should be properly selected in accordance with the other characteristics of the system so that a proper adjustment may be made at the resistor R2 to give the desired signal to noise ratio.

As above mentioned, it is desirable to have the receiver quickly cut-off at the end of a carrier signal, and yet be slow in its operation to cut-off the receiver during conditions of "flutter." In order to accomplish this, it is proposed in accordance with the present invention to provide a timing circuit which is effective to render the squelch control slow in cutting off the receiver just subsequent to a rise in signal strength. During conditions of "flutter," the up-swing of the signal is employed to produce a time lag which is effective during the down-swing of the signal. This action continues while there are recurring increases and decreases in carrier signal strength. However, under average conditions with a carrier signal sufficiently strong to quiet the noise and render the receiver active, there will not usually be a sudden up-swing in the carrier signal immediately preceding the end of transmission of a carrier signal. Consequently, the squelch circuit will ordinarily cut-off the receiver at the end of a transmission without any delay other than that required for the relay CR to drop away, while at the same time providing for a time lag during conditions of "flutter."

The manner in which this is accomplished upon the reception of a carrier signal and the cessation of noise will now be considered in detail. While noise is present, the squelch tube T6 is non-conductive, so that the positive potential from the plate supply PS can charge the condenser C25 through the windings of the relay CR and the rectifier 31 in its positive direction. When the noise ceases or reduces to such a value that the squelch tube T6 again becomes conductive, a current tends to flow from the plate supply PS through the relay CR and the plate-cathode circuit of the tube T6, but because of the reactance of the relay winding, the current through the plate-cathode circuit is actually supplied by the discharge of condenser C25 through the resistors R25 and R26 in series. It is noted that the condenser C25 cannot discharge through the rectifier 31 because such current flow would be in its inverse direction. The current which flows through resistor R26 is in such a direction as to cause its upper terminal to be negative, and this negative voltage serves to bias the control grid of the noise amplifier T5 through resistors R15 and R16 beyond cut-off for a time determined by the capacitance of condenser C25 and the resistance values of resistors R25 and R26. In this connection, it should be understood that the inductance of the carrier relay CR must be sufficient to delay the building up of current through it for a length of time corresponding to the time of discharge of the condenser C25 as above described.

Assuming conditions of "flutter" where the carrier signal decreases and increases in succession, it will be seen that each increase in the carrier signal will result in rendering the above described timing circuit effective for holding the noise amplifier closed for a time ordinarily sufficient to carry over the succeeding down-swing in the carrier signal, and thus maintain the receiver effective to reproduce the message of the carrier signal. This assumes that the carrier signal had been initially strong enough to render the receiver active. In this way, the present invention provides a squelch control which has a time lag effective only under conditions of "flutter."

From the above description, it will be apparent that although the receiving organization including the discriminator, audio amplifier, and power amplifier may be used alone and have advantageous characteristics for eliminating the reproduction of radio noise by the loudspeaker, it is particularly well adapted to have associated with it a squelch control organization which is governed in accordance with radio noise potentials. This is because the manner of rendering the discriminator degenerative with respect to radio noise potentials, is particularly adaptable for providing radio noise potentials for governing the squelch control circuit organization.

Also, it should be further understood that the squelch control circuit organization may be employed with other types of receiving means, so long as provision is made for supplying noise potentials for the noise amplifier; but at the same time it should be appreciated that the squelch control organization shown and described is particularly adaptable in a receiving organization employed with mobile units and especially those wherein check tone pulses are also used to check the integrity of the communication system. This is because in a communication system employing check pulses, the carrier signal is being applied and removed intermittently for a considerable portion of the time, and it would be highly objectionable in such a system to have it subject to "noise tails" following the successive check tone pulses.

Having described radio receiving organization as one specific embodiment of the present invention, it is desired to be understood that this form is selected to facilitate in the disclosure of the invention rather than to limit the number of forms which it may assume; and, it is to be further understood that various modifications, adaptations, and alterations may be applied to the specification form shown to meet the requirements of practice without in any manner departing from the spirit or scope of the present invention.

What we claim is:

1. In a radio receiving organization for frequency modulated signals, a discriminator comprising in combination, a tuned tank circuit constituting the secondary of a radio frequency transformer, two electron tubes each having a control grid coupled to said tank circuit which is capacitatively coupled at a mid point to the input of the primary of said transformer, a grid leak connection for said grids of said tubes, and a common cathode resistor for said tubes conducting the combined plate currents of said tubes and also included in the grid circuits of the tubes, said cathode resistor having a value to bias the grids of said tubes substantially to cut-off for a combined plate circuit output of said tubes corresponding to the normal amplitude level of the frequency modulated signal supplied to said discriminator, a squelch control for the receiving organization including a noise amplifier having an in-put circuit supplied with potentials appearing across said cathode biasing resistor, said squelch control acting when said noise voltages rise above a predetermined value to mute said receiver, whereby any dissymmetry in the signal passing through said discriminator acts to supply a noise potential to said squelch control means.

2. In a radio receiving organization including a discriminator comprising in combination, a tuned tank circuit, two electron tubes having control grids coupled to said tank circuit, a balanced out-put circuit for controlling a push-pull amplifier in accordance with the difference in the out-put of the two tubes, a single cathode resistor included in series with the cathodes of said two tubes in multiple and conducting the combined plate output current of said tubes changing with amplitude of the frequency modulated signal supplied to said discriminator, said resistor also being in the grid circuits of the discriminator and said resistor being of such a value as to bias said tubes to substantially cut-off for a predetermined amplitude level of said signal, a noise amplifier tube having a control grid supplied with voltage variations appearing across said cathode biasing resistor, and circuit means controlled by the out-put of said amplifier tube for muting said receiver organization when the noise voltages supplied by said cathode resistor rise above a predetermined value.

3. In a radio receiving organization, a balanced triode discriminator having a common cathode biasing resistor included in its plate and grid circuits, an audio amplifier governed by the out-put of said discriminator, tone responsive means including a relay governed by the out-put of said audio amplifier so as to be operated only when a predetermined tone is received, a noise amplifier governed by the noise voltages appearing across said common cathode biasing resistor, circuit means governed by said noise amplifier for muting said audio amplifier when said noise voltages rise above a predetermined value, and indicator means controlled jointly by said relay and said circuit means.

4. In a radio receiving organization including in combination, a balanced triode discriminator having a single cathode biasing resistor common to both triodes of the discriminator, an audio amplifier connected to operate push-pull in accordance with the out-put of said discriminator, a tone relay governed by the out-put of said audio amplifier so as to be operated when a pulse of a predetermined tone is received, a noise amplifier having circuit connections so as to be governed by voltages appearing across said cathode biasing resistor, a squelch relay governed by the out-put of said noise amplifier and acting to mute said receiver when said noise voltages rise above a predetermined value and whenever the reception of a carrier signal ceases, and check circuit indicator means governed jointly by said squelch relay and said tone relay to give an indication when both of said relays are intermittently energized by the reception of check pulses of said predetermined tone and to give a different indication whenever said squelch relay is operated to render said receiver effective and said tone relay is not operated.

5. In a radio receiving organization having a power amplifier giving an audio frequency out-put in accordance with the frequency modulations of the radio frequency carrier signal being received by the organization, a squelch control means including a noise amplifier governed in accordance with the noise voltages within the receiver and effective to render said power amplifier ineffective when the noise voltages are of substantial value, and circuit means associated with the out-put of said noise amplifier to cause a negative bias feed-back for said noise amplifier each time the noise voltages rise but not when the noise voltages decrease to thereby provide a delay in the squelch operation during signals of varying amplitude.

6. In combination, a radio receiving organization for frequency modulated carrier signals including a balanced triode discriminator having a common cathode biasing resistor connected in both the grid and plate circuits of the discriminator to act degeneratively with respect to noise voltages effecting an unbalance of such discriminator, a noise amplifier having its grid connected to receive an input from said common cathode resistor to thereby provide an output in accordance with the value of noise voltages appearing in the discriminator of said radio receiving organization, an electromagnetic relay having a pick-up value higher than its drop-away value, said relay being controlled by the output of said noise amplifier so as to be picked up when the noise voltages drop to a particular low value and to remain picked up until such noise voltages rise to a particular higher value, and circuit means controlled by said relay when picked up for rendering said radio receiving organization capable of giving an output signal.

7. In a radio receiving organization for frequency modulated carrier signals and including limiter and discriminator stages, said discriminator having two tubes with a common cathode resistor connected to be included in the grid-cathode circuit of each tube of the discriminator to thereby act degeneratively with respect to unbalancing noise voltages, a noise amplifier having its control grid supplied with an input comprising any noise voltages existing across said common cathode resistor, a squelch tube having a control grid supplied with the output of said noise amplifier through a capacitance, said control grid of said squelch tube being connected to its cathode through a grid leak resistor of such a value as to cause said squelch tube to have plate current varying in value in accordance with the amplitude of the output of said noise amplifier, an electromagnetic relay included in the plate-cathode circuit of said squelch tube and having such characteristics as to be released when the output of said noise amplifier rises to a particular value, and circuit means for muting said radio receiver when said relay is dropped away.

8. In a radio receiver having a power amplifier giving an audio frequency output in accordance with the modulations of the radio frequency carrier signal being received, a noise amplifier tube having its grid connected to receive an input voltage dependent upon the receiver output noise voltages, a squelch control tube connected to receive the output of said noise amplifier and giving a direct current output in its plate circuit of a value dependent upon the amplitude of such noise voltages, an electromagnetic relay, a direct current source, said relay and said source being connected in series in the plate circuit of said control tube, said relay being effective to mute said power amplifier when the noise voltages supplied to said noise amplifier rise above a predetermined value, a capacitor and a rectifier connected in series and then connected in multiple with said relay and said direct current source, a resistor connected in multiple with said rectifier to provide a slow discharge circuit for said capacitor through the plate circuit of said control tube when the potential drop across the control tube is reduced, and circuit means controlled by the potential drop across said resistor for rendering said noise amplifier less sensitive to the noise voltages within the receiver for a limited time.

9. In a radio receiving organization for receiving frequency modulated carrier signals and including a limiter stage and a discriminator stage, said discriminator including two grid controlled tubes having a common cathode resistor connected in both the plate and grid circuits of both tubes to act degeneratively with respect to noise voltages effecting an unbalance of said discriminator, a noise amplifier having its control grid connected to said common cathode resistor to receive as an input any noise voltages existing across said common cathode resistor, said control grid having a normal negative bias but allowing an output of said noise amplifier upon the reception and an input, an electromagnetic relay effective to mute said receiver organization when said relay is released, circuit means including an electron tube controlled by the output of said noise amplifier to cause current flow through said relay to actuate it during the absence of an output from said noise amplifier, said circuit means being effective to remove current flow from said relay when said noise amplifier gives an output, and other circuit means effective in response to the increase of current flow through said relay to cause an increase in the negative bias on said control grid of said noise amplifier for a time thereafter greater than the duration of said current flow increase, said circuit means being unresponsive to a decrease in energy through said relay, whereby said relay is controlled to quickly mute said receiver organization upon the cessation of reception of a steady carrier signal, but upon the recurrent rise and fall of said carrier signal said relay is controlled to remain in the condition existing upon the initiation of such recurring changes in the received carrier signal.

JOHN C. O'BRIEN.
HENRY C. SIBLEY, Jr.

REFERENCES CITED

The following references are of record in the file of this patent:

UNITED STATES PATENTS

| Number | Name | Date |
|---|---|---|
| 2,007,399 | Koch | July 9, 1935 |
| 2,151,145 | Percival | Mar. 21, 1939 |
| 2,173,426 | Scott | Sept. 19, 1939 |
| 2,243,414 | Carlson | May 27, 1941 |
| 2,280,421 | Chappell et al. | Apr. 21, 1942 |
| 2,296,089 | Crosby | Sept. 15, 1942 |
| 2,301,649 | Thompson | Nov. 10, 1942 |
| 2,316,902 | Trevor | Apr. 20, 1943 |
| 2,343,115 | Noble | Feb. 29, 1944 |
| 2,351,191 | Crosby | June 13, 1944 |
| 2,351,212 | Houghton | June 13, 1944 |
| 2,412,482 | Wilkomerson | Dec. 10, 1946 |
| 2,435,010 | Knapp et al. | Jan. 27, 1948 |